United States Patent
Su et al.

(10) Patent No.: US 10,341,081 B2
(45) Date of Patent: Jul. 2, 2019

(54) USER EQUIPMENT THAT AUTONOMOUSLY SELECTS BETWEEN FULL AND HALF DUPLEX OPERATIONS

(71) Applicant: Apple Inc., Cupertino, CA (US)

(72) Inventors: Li Su, San Jose, CA (US); William J. Noellert, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/495,010

(22) Filed: Apr. 24, 2017

(65) Prior Publication Data

US 2018/0026777 A1    Jan. 25, 2018

Related U.S. Application Data

(60) Provisional application No. 62/365,958, filed on Jul. 22, 2016.

(51) Int. Cl.
| | |
|---|---|
| *H04L 5/16* | (2006.01) |
| *H04B 17/309* | (2015.01) |
| *H04W 72/04* | (2009.01) |
| *H04L 5/14* | (2006.01) |
| *H04B 1/3827* | (2015.01) |

(52) U.S. Cl.
CPC ............ *H04L 5/16* (2013.01); *H04B 17/309* (2015.01); *H04L 5/14* (2013.01); *H04W 72/0446* (2013.01); *H04B 1/3833* (2013.01)

(58) Field of Classification Search
None
See application file for complete search history.

(56) References Cited

U.S. PATENT DOCUMENTS

| | | |
|---|---|---|
| 8,462,671 B2 | 6/2013 | Rinne et al. |
| 9,131,524 B2 | 9/2015 | Gaal et al. |

(Continued)

FOREIGN PATENT DOCUMENTS

WO    WO 2016/111638    7/2016

OTHER PUBLICATIONS

International Search Report and Written Opinion, Application No. PCT/US2017/043314, dated Oct. 20, 2017, 13 pages.

(Continued)

*Primary Examiner* — Kibrom T Hailu
(74) *Attorney, Agent, or Firm* — Meyertons Hood Kivlin Kowert and Goetzel PC; Jeffrey C. Hood

(57) ABSTRACT

A user equipment (UE) comprises a radio having TX and RX paths that include a duplexer, thus facilitating a full-duplex mode. The radio may also have TX and RX paths that exclude the duplexer, and which thus facilitate a half-duplex mode. The UE may be configured to autonomously and opportunistically switch from the full-duplex mode (the paths that include the duplexer) to the half-duplex mode (the paths that exclude the duplexer) when the UE desires to avoid the path loss caused by the duplexer, e.g., to temporarily receive with greater sensitivity and/or transmit with more power, during poor channel conditions. At other times the UE may autonomously decide to remain in full-duplex mode to achieve reduced transmission time, e.g., during time-critical communications such as VoLTE. The UE may autonomously determine whether to use full or half-duplex mode, i.e., without requiring any coordination with network-side devices.

20 Claims, 6 Drawing Sheets

(56) References Cited

U.S. PATENT DOCUMENTS

| | | | |
|---|---|---|---|
| 2007/0254692 A1 | 11/2007 | McCoy | |
| 2011/0222445 A1* | 9/2011 | Alanara | H04W 36/06 370/281 |
| 2014/0016524 A1* | 1/2014 | Choi | H04W 72/121 370/281 |
| 2014/0106677 A1* | 4/2014 | Altman | H04B 1/3827 455/41.2 |
| 2014/0370812 A1* | 12/2014 | Mauney | H04M 1/72519 455/41.2 |
| 2015/0333896 A1 | 11/2015 | Damnjanovic et al. | |
| 2015/0382375 A1 | 12/2015 | Bhushan et al. | |
| 2016/0270135 A1* | 9/2016 | Lim | H04W 74/0833 |
| 2016/0330791 A1* | 11/2016 | Vajapeyam | H04W 68/005 |
| 2018/0007724 A1* | 1/2018 | Kazmi | H04W 8/005 |

OTHER PUBLICATIONS

Written Opinion, Application No. PCT/US2017/043314, dated Jun. 27, 2018, 6 pages.

* cited by examiner

USER EQUIPMENT THAT AUTONOMOUSLY SELECTS BETWEEN FULL AND HALF DUPLEX OPERATIONS

PRIORITY CLAIM

This application claims benefit of priority to Application No. 62/365,958 titled "User Equipment That Autonomously Selects Between Full and Half Duplex Operations", filed on Jul. 22, 2016, which is hereby incorporated by reference as though fully and completely set forth herein.

FIELD

The present application relates to wireless communication, and more particularly, to a user equipment (UE) that autonomously selects between full and half-duplex operations in a radio access technology such as FDD-LTE.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, etc.

A device that is link budget limited (i.e., a device that has limited battery and/or power capability) may have reduced capabilities relative to a "normal device, i.e., a device that is not link budget limited. A device may be link budget limited because of the size of its battery (e.g., the device may only have a finite amount of current that may be drawn from the battery) and/or because of the efficiency of its antenna (e.g., in order to maintain connectivity with the base station, the antenna's power amplifier may need to operate at maximum output), among other possible reasons. For example, a link budget limited device may have degraded RF sensitivity in both the uplink (UL) and the downlink (DL). In addition, such a device may not be able to transmit continuously in the UL, e.g., may not be able to sustain high current consumption during continuous transmission in peak power mode.

In LTE Frequency Division Duplexing (LTE-FDD), a UE may be permanently configured as a full-duplex device, which allows simultaneous operation of the transmit (TX) and receive (RX) chains. However, full-duplex LTE-FDD has requirements to satisfy simultaneous operation that may result in degradation of the TX and RX chains, which is undesirable for a link budget limited device. Alternatively, in LTE FDD a UE may be permanently configured in half-duplex mode. UE configuration in half-duplex mode may provide a slight performance improvement in the TX and RX chains, at the considerable cost of a 50% reduction in bandwidth (or a doubling of transmit time). This 50% bandwidth reduction causes considerable problems with the transmission of time-sensitive data, such as VoLTE (Voice over LTE).

Therefore, improvements in the field would be desirable.

SUMMARY

Embodiments are presented herein of, inter alia, a user equipment (UE) with improved communication methods that enable a UE, that may be link budget limited, to autonomously select between full-duplex and half-duplex operations.

Embodiments relate to a user equipment device (UE) comprising at least one antenna, at least one radio, and one or more processors coupled to the radio. The at least one radio is configured to perform cellular communication using at least one radio access technology (RAT). The one or more processors and the at least one radio are configured to perform voice and/or data communications.

In some embodiments, the radio is configured to include TX and RX paths that include a duplexer, thus facilitating a full-duplex mode. The radio may also be configured with TX and RX paths that exclude the duplexer, and which thus facilitate a half-duplex mode. The UE may be configured to autonomously and opportunistically switch from the full-duplex mode (the paths that include the duplexer) to the half-duplex mode (the paths that exclude the duplexer) when the UE desires to avoid the path loss caused by the duplexer, i.e., to temporarily receive with greater sensitivity and/or to transmit with more power, during poor channel conditions. At other times the UE may autonomously decide to remain in full-duplex mode to achieve reduced transmission time, e.g., during time-critical communications such as VoLTE. The UE may autonomously determine whether to use full or half-duplex mode, i.e., without requiring any coordination with or permission from network-side devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
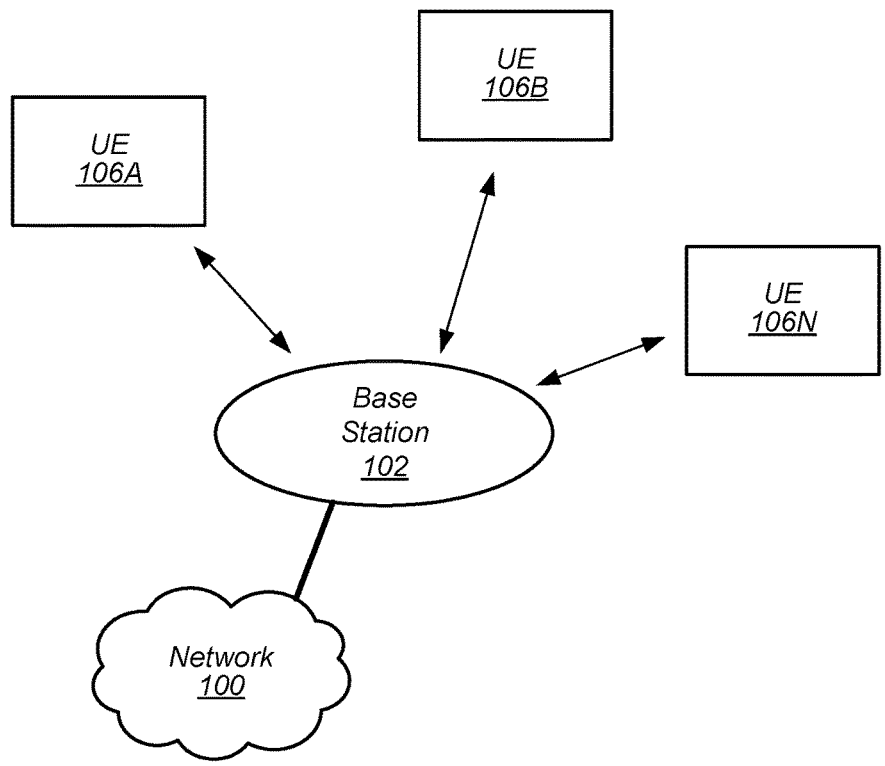
FIG. 1 illustrates a wireless communication system in accordance with some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
BS: Base Station
DL: Downlink (from BS to UE)
UL: Uplink (from UE to BS)
FDD: Frequency Division Duplexing
TDD: Time Division Duplexing
GSM: Global System for Mobile Communication
LTE: Long Term Evolution
TX: Transmission
RX: Reception
UMTS: Universal Mobile Telecommunication System
LAN: Local Area Network
WLAN: Wireless LAN
RAT: Radio Access Technology Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system that connects to the first computer system over a network, such as the Internet. In the latter instance, the second computer system may provide program instructions to the first computer for execution. The term "memory medium" may include two or more memory mediums, which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices that are mobile or portable and that perform wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" may be broadly defined to encompass any electronic, computing, and/or telecommunications device (or combination of devices) that is easily transported by a user and capable of wireless communication.

Base Station—The term "Base Station" (also called "eNB") has the full breadth of its ordinary meaning, and at least includes a wireless communication station installed at a fixed location and used to communicate as part of a wireless telephone system or radio system.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Link Budget Limited—includes the full breadth of its ordinary meaning, and at least includes a characteristic of a wireless device (a UE) that exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/ receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—Wireless Communication System

FIG. 1 illustrates an exemplary wireless cellular communication system. It is noted that FIG. 1 represents one possibility among many, and that features of the present disclosure may be implemented in any of various systems, as desired.

As shown, the exemplary wireless communication system includes a base station 102A, which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB- H), etc. Other combinations of wireless communication technologies (including more than two wireless communication technologies) are also possible. Likewise, in some instances a UE device 106 may be configured to communicate using only a single wireless communication technology.

Figure 2:
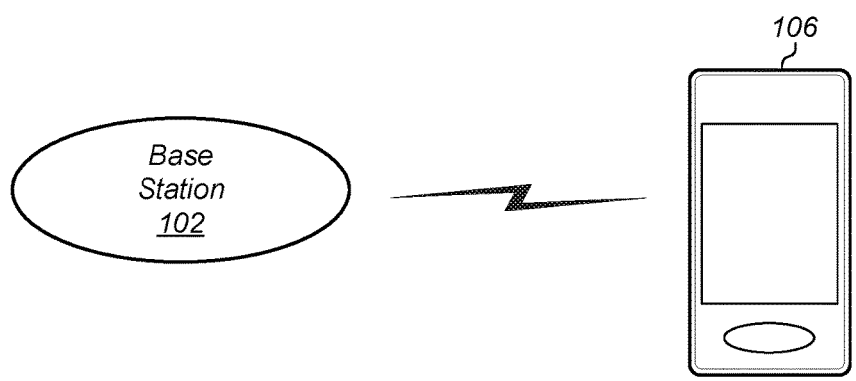
FIG. 2 illustrates a base station ("BS", or in the context of LTE, an "eNodeB" or "eNB") in communication with a wireless device, in accordance with some embodiments.

FIG. 2 illustrates UE device 106 (e.g., one of the devices 106A through 106N) in communication with base station 102. The UE device 106 may have cellular communication capability, and as described above, may be a device such as a mobile phone, a hand-held device, a wearable device, a media player, a computer, a laptop or a tablet, or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array), or other circuitry, that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In one embodiment, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios, e.g., may comprise a single TX chain and two or more RX chains. As another example, the UE 106 might include a shared radio for communicating using either of LTE or 1xRTT (or LTE or GSM), and separate radios for communicating using each of Wi-Fi and Bluetooth. Other configurations are also possible.

Figure 3:
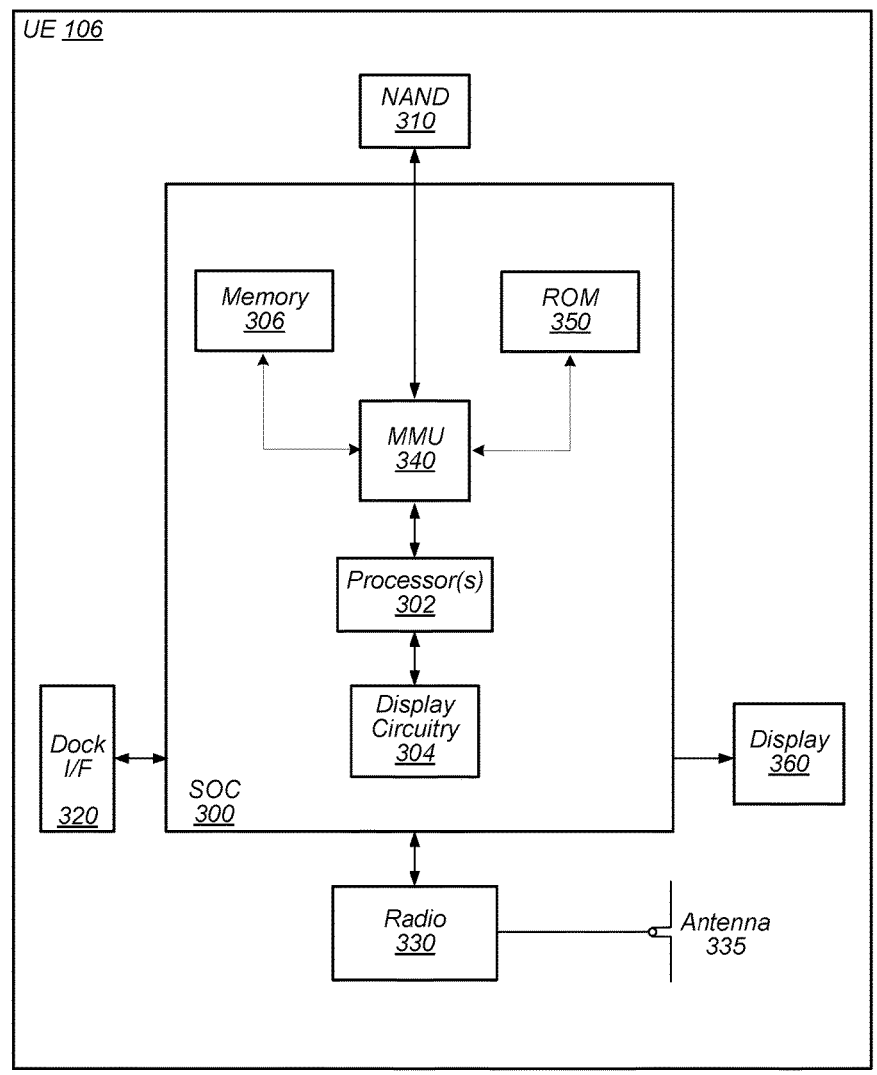
FIG. 3 illustrates a block diagram for a UE device, in accordance with some embodiments.

FIG. 3—Example Block Diagram of a UE

FIG. 3 illustrates a block diagram of a UE 106 in accordance with some embodiments. As shown, the UE 106 may include a system on chip (SOC) 300, which may include portions for various purposes. For example, as shown, the SOC 300 may include processor(s) 302, which may execute program instructions for the UE 106, and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F 320, and/or display 360.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including Flash 310), a connector interface 320 (e.g., for coupling to a computer system), the display 360, and wireless communication circuitry (or radio) 330 (e.g., for communication using LTE, CDMA2000, Bluetooth, WiFi, GPS, etc.).

Figure 5:
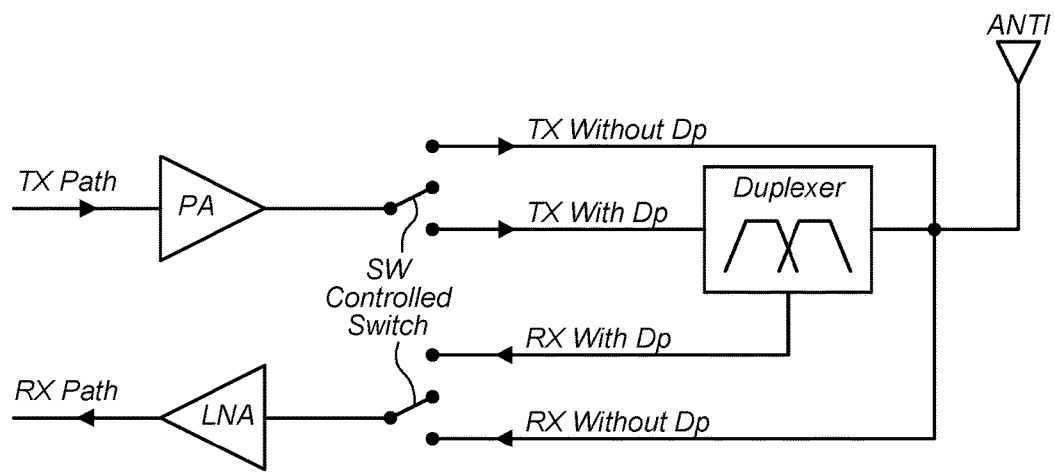
FIG. 5 illustrates a portion of the RX and TX chain paths that incorporate a duplexer (full-duplex mode) and that exclude the duplexer (half-duplex mode)

The wireless communication circuitry (radio) 330 of the UE may comprise an RF front end that supports both full-duplex and half-duplex configurations. The wireless communication circuitry may comprise added half-duplex dedicated ports that bypass acoustic filters that are present on the full-duplex RF ports. This enables software controlled TX and RX on the full-duplex path or half-duplex path for each FDD band. FIG. 5 illustrates this portion of the UE wireless communication circuitry in greater detail.

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and software components for implementing the features described herein. For example, the processor(s) 302 of the UE 106 may be configured to implement part or all of the features described herein, e.g., by executing program instructions stored on a memory medium (e.g., a non-transitory computer-readable memory medium). Alternatively (or in addition), processor(s) 302 may be configured as a programmable hardware element, such as an FPGA (Field Programmable Gate Array), or as an ASIC (Application Specific Integrated Circuit). Alternatively (or in addition) the processor(s) 302 of the UE 106, in conjunction with one or more of the other components 300, 304, 306, 310, 320, 330, 335, 340, and 350 may be configured to implement part or all of the features described herein.

In addition, as described herein, processor(s) 302 may include one or more processing elements. In other words, one or more processing elements may be included in processor(s) 302. Thus, processor(s) 302 may include one or more integrated circuits (ICs) that are configured to perform the functions of processor(s) 302. In addition, each integrated circuit may include circuitry (e.g., first circuitry, second circuitry, etc.) configured to perform the functions of processor(s) 204.

Further, as described herein, radio 330 may include one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 4:
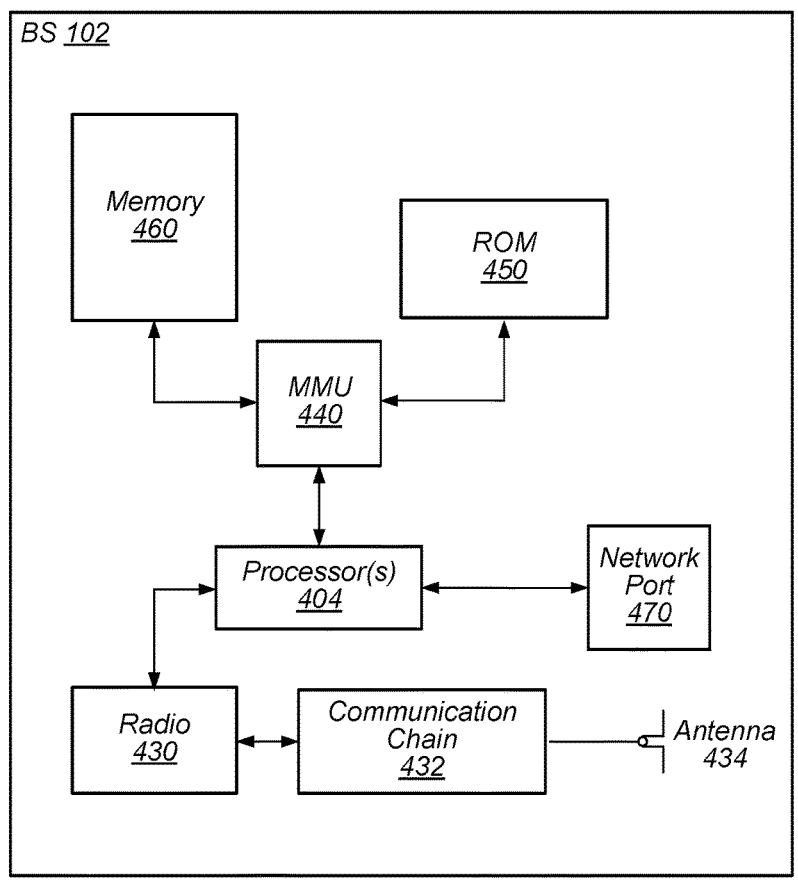
FIG. 4 illustrates a block diagram for a base station, in accordance with some embodiments.

FIG. 4—Base Station

FIG. 4 illustrates a base station 102 in accordance with some embodiments. It is noted that the base station of FIG. 4 is merely one example of a possible base station. As shown, the base station 102 may include processor(s) 404, which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

In addition, as described herein, processor(s) 404 may include one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Link Budget Limited Devices

As described above, a device that is link budget limited (i.e., a device that has limited battery and/or limited power amplifier capability) may have reduced communication capabilities relative to a device that is not link budget limited. One typical example of a link budget limited device is a wearable device such as a smart watch. A link budget limited device may have degraded RF sensitivity in one or both of the uplink (UL) and the downlink (DL). For example, the device may have up to 10 dB of degradation in link budget in the uplink and downlink compared to a mobile phone. Alternatively, or in addition, the device may not be able to transmit continuously in the UL, e.g., due to its small battery the device may not be able to sustain high current consumption when performing continuous RF transmission at peak power. Instead, the device may perform high power uplink transmissions according to a specified duty cycle.

FDD Operation

The current LTE standard includes two different protocols for uplink/downlink communications, these being TD-LTE and FDD-LTE. TD-LTE refers to time division LTE. TD-LTE uses one frequency band and switches between uplink and downlink in a temporal fashion. TD-LTE can operate in a non-symmetric fashion, where DL and UL operations can be assigned different amounts of time or bandwidth. FDD-LTE uses frequency division duplexing or "paired spectrum". Uplink communication is performed on a first frequency band, and downlink communication is performed on a second different frequency band. FDD-LTE is a symmetric configuration, where DL and UL operations may receive the same amount of bandwidth.

Current standards (e.g., 3GPP Release 8 (i.e., LTE)) support both full and half-duplex frequency division duplex (FDD) operation. Full-duplex FDD (FD-FDD) operation allows for concurrent transmit and receive in one sub-frame. Half-duplex FDD (HD-FDD) does not allow for concurrent transmit and receive in one sub-frame. Rather, in half-duplex FDD, only one of transmit operations or receive operations can be performed at any given time.

In some embodiments, LTE half-duplex FDD (HD-FDD) may have the following benefits. First, HD-FDD reduces the front end cost by eliminating the need for a duplexer shared by both the RX and TX RF paths. This duplexer is used in full-duplex FDD systems to isolate the RX from the TX while permitting them to share a common antenna. Also, the half-duplex RF front end circuitry bypasses the acoustic filters in the duplexer. This may improve the RX sensitivity by 1-2 dB, improve the FR TX output power by 1-2 dB, and/or decrease the TX peak current consumption by 40-75 mA.

There may be use cases, as further described below, wherein HD-FDD may hamper the functionality of link budget limited devices such as wearable devices. This is particularly problematic since HD-FDD is designed to be a permanent configuration for a UE.

During good channel conditions (good radio conditions) such as a near cell condition (when the UE is close to a cell tower), during uplink communications LTE TX power is much lower than the peak power (23 dBm), and thus the 1-2 dB peak power efficiency saving due to a half-duplex configuration may not be useful. During downlink operations the 1-2 dB DL gain achieved by HD-FDD does not increase the DL transport block size very much, as the transport block size is already sufficiently large due to good radio conditions. During poor channel conditions (weak radio conditions) such as a far cell condition (when the UE is far from its cell tower), the HD-FDD configuration can help non-time-sensitive data to increase the UL link budget by 1-2 dB as mentioned above.

As noted above, in 3GPP LTE, HD-FDD (half-duplex FDD) is a constant (or permanent) UE and network configuration. Thus, when configured in this manner, the base station always schedules UL and DL based on this half-duplex configuration, with effectively a 50% duty cycle for both UL and DL. This reduces both UL and DL throughput by half, and doubles both the TX and RX time, thus consuming double the amount of power. For time-sensitive data such as VoLTE, since transmission time is doubled due to the half-duplex configuration, it may be difficult for the UE to meet the VoLTE delay requirements (or budget). For example, in current commercial network systems 100 ms is the maximum delay setting for two-way communication traffic. The longer time delay due to HD-FDD can cause the overall delay to exceed the delay budget required by end-to-end real-time communication such as VoLTE. This can cause performance degradation at the far-end UE, such as causing the other UE's jitter buffer to drop audio packets, or otherwise cause the introduction of user noticeable audio delay.

Therefore, while half-duplex FDD can provide a small improvement in the TX and RX chains during poor radio conditions, this benefit may be more than offset by the doubling of transmission time and associated delay caused to time critical traffic, such as VoLTE.

One possible solution to the problems imposed by HD-FDD on link budget limited devices is for the network to dynamically switch between full-duplex and half-duplex configurations based on UE request. This solution may require modification/customization of base stations (eNodeBs) from the various different network infrastructure vendors, and also would likely require standardization to enable a common implementation. Standardization of such a base station modification could be difficult and time-consuming to achieve. Therefore, improvements in the field are desirable.

Described herein are systems, methods, and apparatuses that, depending on radio conditions and applications, allow a device (e.g., a device such as UE 106) to autonomously decide to operate with differing modes of operation (e.g., full-duplex, half-duplex, etc.) within the context of current 3GPP standards.

FIG. 5: Full-Duplex/Half-duplex Configuration

FIG. 5 illustrates one example embodiment of transmit and receive paths that are dynamically configurable for full-duplex or half-duplex operation. As shown, the circuitry includes a TX path and an RX path. Although the embodiment of FIG. 5 shows only one RX path, it is noted that the system architecture shown in FIG. 5 can readily scale to a greater number of RX paths. For example, in a system that includes one TX chain and two RX chains, the system shown in FIG. 5 would include an additional duplexer and additional RX paths to support the second RX chain.

The TX path receives data generated by the UE for transmission by the antenna (Ant1) to another device. The TX path includes a power amplifier (PA) that in turn couples to a first software controlled switch. The first switch allows for the PA to be selectively coupled to either a first TX path, which includes a duplexer (TX with DP), or a second TX path, which does not include a duplexer (TX without DP). The first TX path and the second TX path then couple to the antenna (Ant1). The first switch may be under software control and allows the UE to select either a full-duplex TX configuration (the first path, which includes the duplexer—TX With DP) or a half-duplex TX configuration (the second path, which bypasses the duplexer—TX Without DP).

As shown, the duplexer is also included in a first RX path of the UE. The antenna (Ant1) couples through the duplexer to the first RX path (RX with DP), which then couples to a second software controlled switch. The antenna (Ant1) also couples directly to the second switch, thereby forming a second RX path (RX without DP) that bypasses the duplexer. The second switch may be under software control and allows the UE to select either a full-duplex RX configuration (the first RX path, which includes the duplexer—RX With DP) or a half-duplex RX configuration (the second RX path, which bypasses the duplexer—RX Without DP). The second switch couples to a LNA (Low Noise Amplifier), which in turn is coupled to the remainder of the RX path.

The UE front end circuitry thus includes added half-duplex dedicated ports (the TX without DP path and the RX without DP path) that bypass the acoustic filters that are present on the full-duplex ports. Thus the UE front end supports both full-duplex and half-duplex configurations, and the UE enables software controlled transmit and receive on either a full-duplex path or a half-duplex path for each FDD band.

As described below, the UE may autonomously select either the full-duplex or half-duplex configurations (TX or RX or both) based on current conditions, including current channel conditions as well as a current operating state of the UE. As used herein, the term "autonomously" means that the UE may select among the full or half-duplex configurations on its own, without having to coordinate with or request permission from the network side specifically for this purpose.

Figure 6:
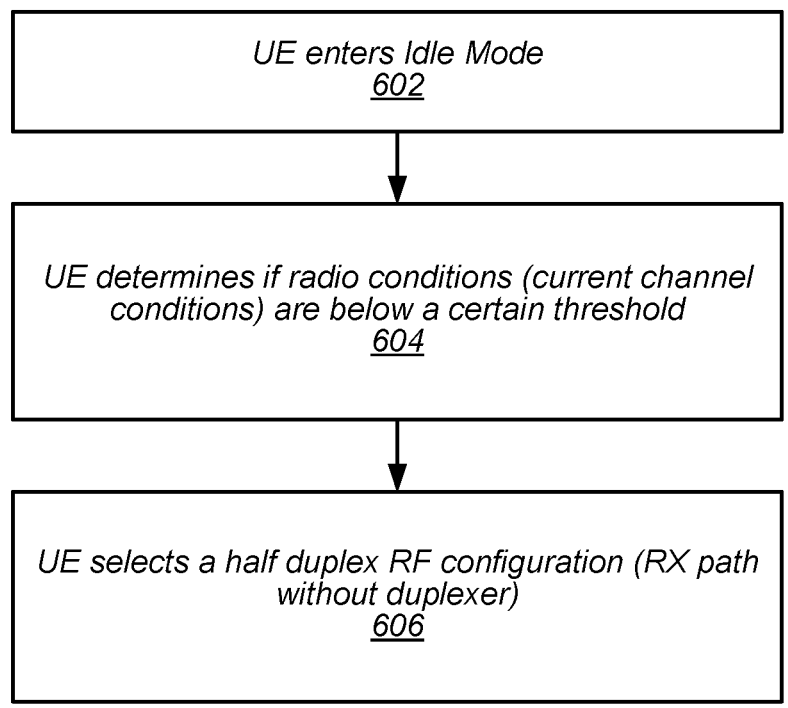
FIG. 6 is a flow diagram of a method for a user equipment device to autonomously select full or half-duplex mode when in idle mode, in accordance with some embodiments.

FIG. 6: Idle Mode Selection of Full-Duplex/Half-Duplex Configuration

FIG. 6 is a flowchart diagram illustrating one embodiment of operation of the UE when the UE is in idle mode.

As shown, at 602 the UE may enter idle mode, such as LTE idle mode. In LTE idle mode the UE may be performing various operations, such as System Information Block (SIB) decoding, page decoding, cell selection, or reselection, or the UE may be in idle DRX mode.

At 604 the UE determines if current channel conditions (or radio conditions) have fallen below a certain threshold. Various types of channel condition metrics may be used, such as RSRP (Reference Signal Receive Power) or RSRQ ((Reference Signal Receive Quality). For example, the UE may determine if RSRP<=−100 dBm and/or RSRQ<=−3, among other possible criteria.

If the UE determines that the channel conditions have fallen below the threshold while in idle mode, at 606 the UE (e.g., software executing on the UE) may autonomously configure its RX path to be in half-duplex mode, e.g., may enable the half-duplex (HD) dedicated ports (the RX path that bypasses the duplexer) for RX instead of using the duplexer filtered full-duplex RF RX path. Thus the UE may select the half-duplex dedicated ports (the RX path that bypasses the duplexer—"RX Without DP"). Note that it may be unnecessary for the UE to change the TX path configuration, since no transmissions occur in idle mode. This produces a 1-2 dB DL gain in the RX path for the operations currently being performed by the UE, such as intra/inter and IRAT cell detection and measurement, SIBs decoding, and/or page decoding, etc.

When these conditions are no longer valid, e.g., when the UE either leaves idle mode or the channel conditions improve to be above the threshold used in 604 (or possibly a different threshold), then the UE may return its RX configuration back to full-duplex mode.

Figure 7:
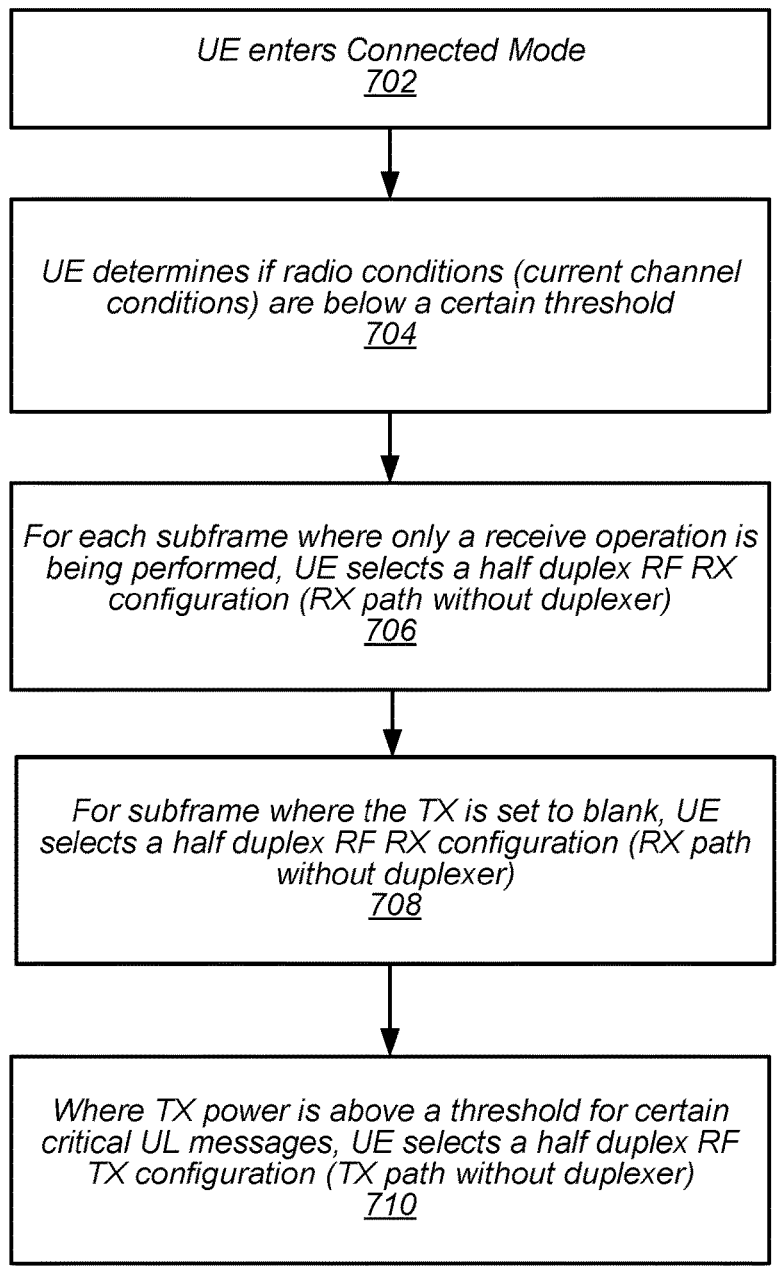
FIG. 7 is a flow diagram of a method for a user equipment device to autonomously select full or half-duplex mode when in connected mode, in accordance with some embodiments.

FIG. 7: Connected Mode Selection of Full-Duplex/Half-duplex Configuration

FIG. 7 is a flowchart diagram illustrating one embodiment of operation of the UE when the UE is in connected mode.

As shown, at 702 the UE may enter connected mode, such as LTE connected mode. In LTE connected mode the UE may be performing various operations, such as actual transmit communications with a far end UE (or with the network).

At 704 the UE determines if radio conditions have fallen below a certain threshold. Similar to above, various types of radio condition metrics may be used, such as RSRP (Reference Signal Receive Power) or RSRQ (Reference Signal Receive Quality). Example metrics may be RSRP<=−100 dBm or RSRQ<=−3, among other possible criteria.

If the UE determines that the radio conditions have fallen below the threshold while in connected mode, the UE may perform one or more of the operations below.

1) At 706, for each subframe where only a receive operation is being performed, and no transmit operation is being performed (for each subframe where there is only RX and no TX), enable the half-duplex (HD) dedicated ports (RX path that bypasses the duplexer) for RX to have 1-2 dB gain for DL.

2) At 708, if the TX is set to blank for a certain period of time, such as several subframes, due to a peak power condition or a thermal condition, the UE configures the corresponding RX to use HD dedicated ports (RX path that bypasses the duplexer) instead of the full-duplex RF RX ports. This produces an extra 1-2 dB gain for the downlink (DL) while the TX is blanked.

3) At 710, whenever the UL TX power is above a certain threshold, such as 23 dBm, for certain critical UL messages, the software in the UE can enable HD dedicated ports for TX (TX path that bypasses the duplexer), and turn off the RX. This produces an extra power boost (1-2 dB) on the uplink to extend the UL link budget, increasing the likelihood that at least these critical messages are received. Examples of critical messages include RRC signaling messages, ACK/NAK for DL, and one or more last hybrid automatic repeat request (HARQ) retransmission for a UL transport block, among other possible messages. For example, when implementing HARQ, the UE may retransmit a packet based on an indication that a first transmission of the packet was not properly received. Because the UE is thus aware that the first transmission of the packet was not properly received, the UE may boost the TX power of the retransmission by treating the retransmitted packet as a critical UL message, in which case the software in the UE can enable HD dedicated ports for TX, and turn off the RX. In some scenarios, the UE may treat a retransmission as a critical UL message only after multiple retransmissions. For example, some implementations of HARQ may include a limit on the number of retransmissions allowed. In such cases, the UE may treat only the final one or more transmissions as critical UL messages.

Further Embodiments

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

In some embodiments, a user equipment device (UE) may comprise at least one antenna, at least one radio configured to perform cellular communication using at least one radio access technology (RAT), and one or more processors coupled to the at least one radio and configured to perform voice and/or data communications. In some embodiments, the UE may be configured to determine that one or more radio conditions meet a threshold (or are below a threshold), and the UE may be configured to autonomously select either a full-duplex or half-duplex mode of operation based at least in part on the current radio conditions as well as the operations currently being performed by the UE.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
   at least one antenna;
   at least one radio coupled to the at least one antenna and configured to perform cellular communication using at least one radio access technology (RAT), wherein the at least one radio includes a transmit portion and a receive portion, wherein each of the transmit portion and the receive portion are separately configurable to be placed in a full-duplex mode or a half-duplex mode;
   one or more processors coupled to the at least one radio, wherein the one or more processors and the at least one radio are configured to perform voice and/or data communications;
   wherein the UE is configured to:
   determine that the UE is in a connected mode of operation;
   determine if channel conditions are lower than a first threshold; and
   autonomously configure the half-duplex mode for the receive portion at least in part in response to determining that the UE is in the connected mode and the channel conditions are lower than the first threshold, wherein configuring the half-duplex mode without full duplex mode for the receive portion does not change the configuration of the transmit portion.

2. The UE of claim 1,
   wherein when the UE is in connected mode and channel conditions are lower than the first threshold, the UE is configured to place the receive portion in the half-duplex mode for a first one or more subframes that involve only receive operations.

3. The UE of claim 1,
   wherein when the UE is in connected mode and channel conditions are lower than the first threshold, the UE is configured to place the receive portion in a half-duplex mode for one or more subframes where the transmit portion is blanked.

4. The UE of claim 1,
   wherein the transmit portion is also configurable to be placed in a full-duplex mode or a half-duplex mode, wherein when the UE is in connected mode and channel conditions are lower than the first threshold, the UE is configured to place the transmit portion in a half-duplex mode for one or more subframes during transmission of certain uplink messages.

5. The UE of claim 4,
   wherein the UE is configured to place the transmit portion in the half-duplex mode for the one or more subframes during transmission of certain critical uplink messages when current transmit power is above a certain threshold.

6. The UE of claim 1,
   wherein the UE is a wearable device.

7. The UE of claim 1,
   wherein the UE device is link budget limited.

8. A non-transitory computer readable memory medium included in a user equipment (UE), wherein the UE comprises a radio comprising a transmit portion and a receive portion, wherein each of the transmit portion and the receive portion are separately configurable to be placed in a full-duplex mode or a half-duplex mode, wherein the memory medium stores program instructions executable by a processor of the UE to:

determine that the UE is in a connected mode of operation;

determine if channel conditions are lower than a first threshold; and at least in part in response to determining that the UE is in the connected mode of operation and the channel conditions are lower than the first threshold, autonomously configure the half-duplex mode either the transmit portion or the receive portion of the radio of the UE, wherein configuring the half-duplex mode without full duplex mode for either the transmit portion or the receive portion does not alter the full-duplex mode or half-duplex mode configuration of the other of the transmit portion or the receive portion.

9. The memory medium of claim 8, wherein when the UE is in connected mode and channel conditions are lower than the first threshold, the program instructions are further executable to:

place the receive portion in the half-duplex mode for a first one or more subframes that involve only receive operations.

10. The memory medium of claim 8, wherein when the UE is in connected mode and channel conditions are lower than the first threshold, the UE is configured to place the receive portion in a half-duplex mode for one or more subframes where the transmit portion is blanked.

11. The memory medium of claim 8, wherein when the UE is in connected mode and channel conditions are lower than the first threshold, the UE is configured to place the transmit portion in a half-duplex mode for one or more subframes during transmission of certain uplink messages.

12. The memory medium of claim 11, wherein the UE is configured to place the transmit portion in the half-duplex mode for the one or more subframes during transmission of certain critical uplink messages when current transmit power is above a certain threshold.

13. The memory medium of claim 8, wherein the UE is a wearable device.

14. The memory medium of claim 8, wherein the UE device is link budget limited.

15. A user equipment (UE), comprising:

at least one antenna;

at least one radio coupled to the at least one antenna and configured to perform cellular communication using at least one radio access technology (RAT), wherein the at least one radio includes a transmit portion and a receive portion, wherein the receive portion is configurable to be placed in a full-duplex mode or a half-duplex mode;

one or more processors coupled to the at least one radio, wherein the one or more processors and the at least one radio are configured to perform voice and/or data communications;

wherein the UE is configured to:

determine that the UE is in an idle mode of operation;

determine if channel conditions are lower than a first threshold; and autonomously configure a half-duplex mode without full duplex mode for the receive portion at least in part in response to determining that the UE is in the idle mode and the channel conditions are lower than the first threshold, wherein said autonomously configuring is performed without coordinating with a network.

16. The UE of claim 15, wherein the transmit portion is also configurable to be placed in a full-duplex mode or a half-duplex mode, and wherein configuring the half-duplex mode for the receive portion does not change the configuration of the transmit portion.

17. The UE of claim 15, wherein the UE is a wearable device.

18. The UE of claim 15, wherein the UE device is link budget limited.

19. The UE of claim 15, wherein the UE is further configured to:

after said autonomously configuring and based on a determination that the UE has left idle mode, return the receive portion to a full-duplex mode.

20. The UE of claim 15, wherein the UE is further configured to:

after said autonomously configuring and based on a determination that the channel conditions are greater than a second threshold, return the receive portion to a full-duplex mode.

* * * * *